United States Patent
Burk

(10) Patent No.: US 9,802,764 B1
(45) Date of Patent: Oct. 31, 2017

(54) REMOTELY OPERATED HYDRAULIC SYSTEM

(71) Applicant: Paul David Burk, Brewster, NE (US)

(72) Inventor: Paul David Burk, Brewster, NE (US)

( * ) Notice: Subject to any disclaimer, the term of this patent is extended or adjusted under 35 U.S.C. 154(b) by 214 days.

(21) Appl. No.: 14/551,548

(22) Filed: Nov. 24, 2014

Related U.S. Application Data

(60) Provisional application No. 61/910,746, filed on Dec. 2, 2013.

(51) Int. Cl.
  *B65G 23/22* (2006.01)
  *F16K 31/122* (2006.01)
  *B60P 1/16* (2006.01)
  *F16K 31/44* (2006.01)

(52) U.S. Cl.
  CPC ............... *B65G 23/22* (2013.01); *B60P 1/16* (2013.01); *B60P 1/162* (2013.01); *F16K 31/122* (2013.01); *F16K 31/44* (2013.01)

(58) Field of Classification Search
  CPC ........ B54G 23/00; B54G 23/22; B54G 23/08; F16K 31/44; F16K 31/122; B65G 23/00; B65G 23/22; B65G 23/08; B60P 1/16; B60P 1/162
  See application file for complete search history.

(56) References Cited

U.S. PATENT DOCUMENTS

| | | | | |
|---|---|---|---|---|
| 4,419,042 A * | 12/1983 | Reed | ..................... | B60P 1/6454 100/218 |
| 6,357,335 B1 * | 3/2002 | Lafler | ................... | B60T 13/683 91/459 |
| 7,780,182 B2 * | 8/2010 | Hyslop | ................. | B60P 3/1033 280/455.1 |
| 8,807,901 B1 * | 8/2014 | Lombardo | ............ | E02F 9/2841 411/347 |
| 8,915,480 B2 * | 12/2014 | Jakobsen | ................ | F15B 21/06 251/30.02 |
| 8,992,155 B2 * | 3/2015 | Meenen | ................. | B60D 1/075 280/402 |

* cited by examiner

*Primary Examiner* — Logan Kraft
(74) *Attorney, Agent, or Firm* — Plager Schack LLP

(57) ABSTRACT

A remotely operated hydraulic system is configured to engage an unloader in a semi-trailer. The remotely operated hydraulic system includes a solenoid mechanically coupled to the semi-trailer. The solenoid is further mechanically coupled to at least one air input line and at least one air output line. A receiver is electrically coupled to the solenoid and communicatively coupled to a remote control. The receiver is configured to open and close the solenoid based on a signal from the remote control. An air cylinder is mechanically coupled to the at least one air output line and a manual valve. Receiving air into the air cylinder operates to open the manual valve. A motor is mechanically coupled to the air cylinder and the unloader; wherein hydraulic pressure from the manual valve is configured to turn the motor and thus the unloader.

3 Claims, 2 Drawing Sheets

REMOTELY OPERATED HYDRAULIC SYSTEM

RELATED APPLICATION

This application claims priority to provisional patent application U.S. Ser. No. 61/910,746 filed on Dec. 2, 2013, the entire contents of which is herein incorporated by reference.

BACKGROUND

The embodiments herein relate generally to automotive accessories.

Prior to embodiments of the disclosed invention, a hand held remote can be used to toggle a hydraulic system off and on. Prior art systems to remotely operate the hydraulic system involve use a solenoid valve that could fail and when would fail the trailer could not be loaded or unloaded without a lot of work. Embodiments of the disclosed invention solve this problem.

SUMMARY

A remotely operated hydraulic system is configured to engage an unloader in a semi-trailer. The remotely operated hydraulic system includes a solenoid mechanically coupled to the semi-trailer. The solenoid is further mechanically coupled to at least one air input line and at least one air output line. A receiver is electrically coupled to the solenoid and communicatively coupled to a remote control. The receiver is configured to open and close the solenoid based on a signal from the remote control. An air cylinder is mechanically coupled to the at least one air output line and a manual valve. Receiving air into the air cylinder operates to open the manual valve. A motor is mechanically coupled to the air cylinder and the unloader; wherein hydraulic pressure from the manual valve is configured to turn the motor and thus the unloader.

In some embodiments, a weather tight box surrounds the solenoid and the receiver. In some embodiments, a pin mechanically couples the air cylinder to the manual value. Removing the pin overrides the solenoid and engages manual operation of the motor.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
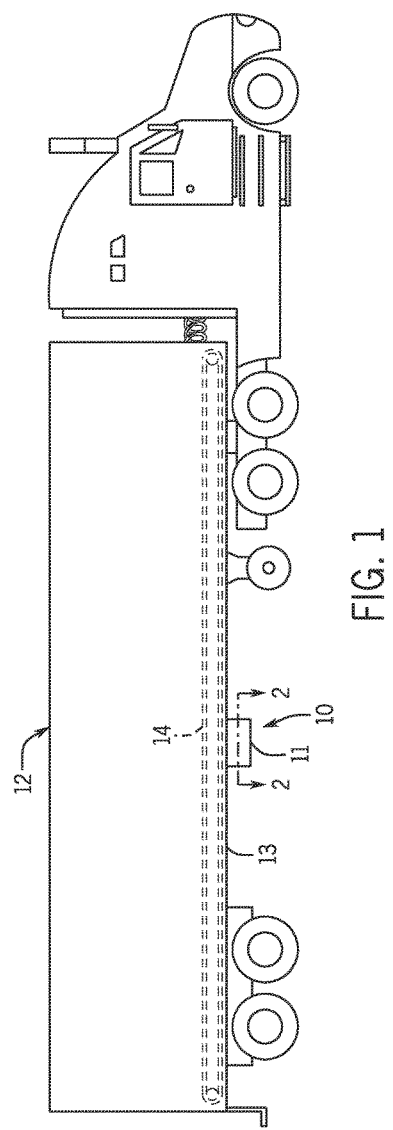
FIG. 1 is a side elevation view of an embodiment of the invention installed in a semi-trailer.

By way of example, and referring to FIG. 1, one embodiment of remotely operated hydraulic system 10 comprises solenoid box 11 mechanically coupled to semi-trailer 12 having trailer bed 13. Trailer bed 13 is mechanically coupled to unloader 14. Unloader 14 can take a variety of different forms, but is shown as a conveyer belt which simply moves cargo either forward or aft within semi-trailer 12.

Figure 2:
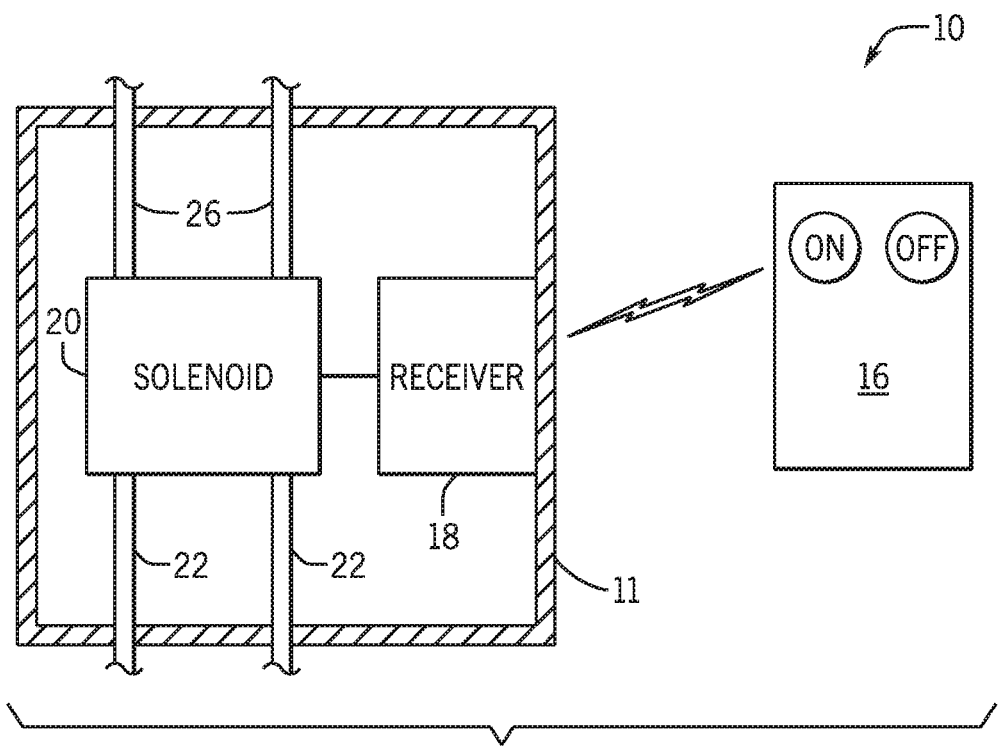
FIG. 2 is a cross-sectional view taken on line 2-2 of FIG. 1.

Turning to FIG. 2, solenoid box 11 further comprises receiver 18. Receiver 18 is communicatively coupled to remote control 16 and solenoid 20. A user can send a signal from remote control 16 that travels through receiver 18 to either open or close solenoid 22. As shown below, this will engage or disengage unloader 14. Solenoid 20 is mechanically coupled to at least one air input line 24 and at least one air output line 26. When solenoid 20 is open, or on, air travels from at least one air input line 24 through solenoid 20 and out at least one air output line 26. When solenoid 20 is closed, or off, air travels from at least one air input line 24 into solenoid 20, where the air stops.

Figure 3:
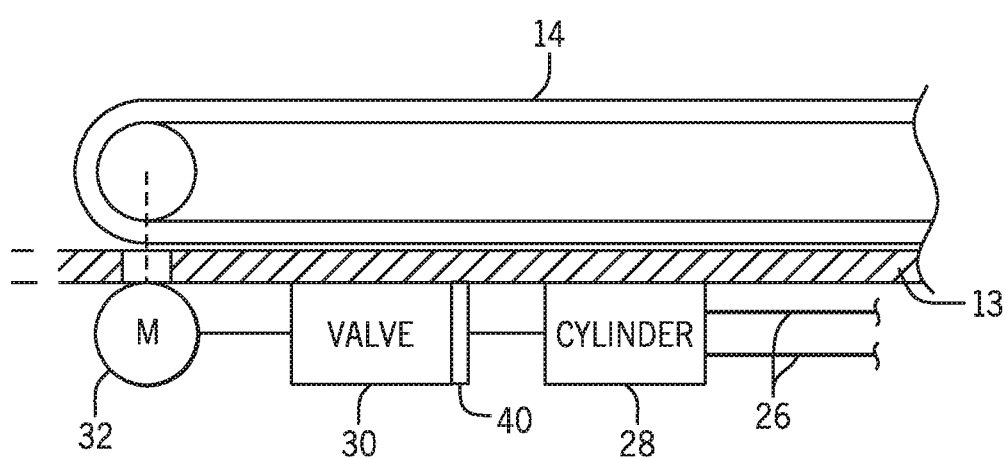
FIG. 3 is a detail elevation view with the truck bed shown in cross-section.

As shown in FIG. 3, air output lines 26 are mechanically coupled to air cylinder 28. Air cylinder 28 is mechanically coupled to manual valve 30. In some embodiments, this connection can be with a pin 40. In those embodiments, overriding air cylinder 28 simply requires removing the pin 40 which is mechanically coupling air cylinder 28 to manual valve 30. Manual valve 30 is mechanically coupled to motor 32. When air in at least one air output line 26 travels into air cylinder 28, air cylinder 28 opens manual valve 30. That causes hydraulic pressure to run through motor 32. Motor 32 turns an axel mechanically coupled to unloader 14 and rotates unloader 14 aft—that is counter clockwise in FIG. 3.

In some embodiments, solenoid box 11 is a weather tight box, which prevents corrosion of components therein. Solenoid 20 can be a 12 volt solenoid powered from a light system within semi-trailer 12. Receiver 18 can be a 12 volt receiver powered from a light system within semi-trailer 12. Receiver 18 can be communicatively coupled to remote control 18 in any known way such as using radio, Bluetooth, 2G, 3G, 4G internet systems and Wi-Fi, Wi-Max, OFDM, CDMA, TDMA, GSM systems, among others.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A remotely operated hydraulic system, configured to engage an unloader in a semi-trailer; the remotely operated hydraulic system comprising:
   a solenoid, configured to be attached to an underside of the semi-trailer; wherein the solenoid is further mechanically coupled to at least one air input line and at least two air output lines;
   a receiver, configured to be attached to an underside of the semi-trailer; and electrically coupled to the solenoid and communicatively coupled to a remote control; wherein the receiver is configured to open and close the solenoid based on a signal from the remote control;
   an air cylinder, configured to be attached to an underside of the semi-trailer and directly attached to the least two air output lines and a manual valve; wherein receiving air into the air cylinder operates to open the manual valve; and
   a motor, configured to be attached to an underside of the semi-trailer and directly attached the manual valve; and further connected to the unloader with the hydraulic system; wherein hydraulic pressure from the hydraulic system engages the motor by operation of the manual valve;
   wherein the receiver is programmed with instructions to:

receive a first signal from the remote control;
open the solenoid causing the air to travel from the air input line through at least one of the air output lines into air cylinder and engages the manual valve to provide hydraulic pressure to the motor wherein the motor is configured to rotate an axel causing the unloader to rotate aft relative to the semi-trailer;
receive a second signal from the remote control;
close the solenoid causing the air to stop traveling from the air input line through at least one of the air output lines into air cylinder and closing the manual valve to cease providing hydraulic pressure to the motor wherein the motor stops rotating the axel causing the unloader to stop rotating aft relative to the semi-trailer.

2. The remotely operated hydraulic system of claim 1, further comprising a weather tight box, surrounding the solenoid and the receiver.

3. The remotely operated hydraulic system of claim 2, further comprising a pin mechanically coupling the air cylinder to the manual value; wherein removing the pin is configured to override the solenoid and engages manual operation of the motor.

\* \* \* \* \*